(12) United States Patent
Kakihara et al.

(10) Patent No.: US 6,597,784 B1
(45) Date of Patent: Jul. 22, 2003

(54) COMPACT DISTRIBUTING FRAME WITH AUTOMATED INTERCONNECTION CAPABILITY

(75) Inventors: Eiichi Kakihara, Kawasaki (JP); Koji Honda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/288,255

(22) Filed: Apr. 8, 1999

(30) Foreign Application Priority Data

Jul. 6, 1998 (JP) .......................................... 10-190324

(51) Int. Cl.$^7$ .......................... H04M 3/00; B23P 19/00; H01R 12/00; H02B 1/056; B25J 11/00
(52) U.S. Cl. .......................... 379/327; 29/739; 439/45; 439/75; 361/803; 379/292; 379/303; 379/306; 700/248; 901/16
(58) Field of Search ................................ 379/291, 292, 379/303, 304, 305, 306, 325, 326, 327; 29/739, 762; 439/45, 48, 75; 361/803; 700/245, 248; 901/16

(56) References Cited

U.S. PATENT DOCUMENTS 5,790,651 A * 8/1998 Suzuki et al. ................ 379/327
5,870,528 A * 2/1999 Fukuda ........................ 700/245
6,295,483 B1 * 9/2001 Isobe et al. .................. 700/245

FOREIGN PATENT DOCUMENTS

| JP | 4-118993 | 4/1992 | ............ H05K/5/00 |
| JP | 4-118995 | 4/1992 | ............ H05K/7/00 |

* cited by examiner

Primary Examiner—Harry S. Hong
(74) Attorney, Agent, or Firm—Katten Muchin Zavis Rosenman (57) ABSTRACT

An automatic main distributing frame, which can easily maintain the size accuracy required to insert into a through hole of the conductive pin is provided. The main distributing frame includes a frame body, plural matrix switch boards accommodated in the frame body, each having matrix switch sections and input/output connectors on a rear section, a back wire board provided on a rear section of the frame body, having connectors connected to the input/output connectors on each rear section of the plural matrix switch boards, and plural robots, each positioned between a pair of two matrix switch board sections of the plural matrix switch boards, each having a hand section for inserting connection pins to the matrix switch sections of the two matrix switch boards.

8 Claims, 11 Drawing Sheets

COMPACT DISTRIBUTING FRAME WITH AUTOMATED INTERCONNECTION CAPABILITY

BACKGROUND OF THE INVENTION

1. Field of the Invention

The present invention relates to a main distributing frame (MDF). More particularly, it relates to a main distributing frame having a function of automatically connecting and disconnecting between subscriber terminals and subscriber circuits of an exchange by employing a robot.

2. Description of the Related Art

Figure 9:
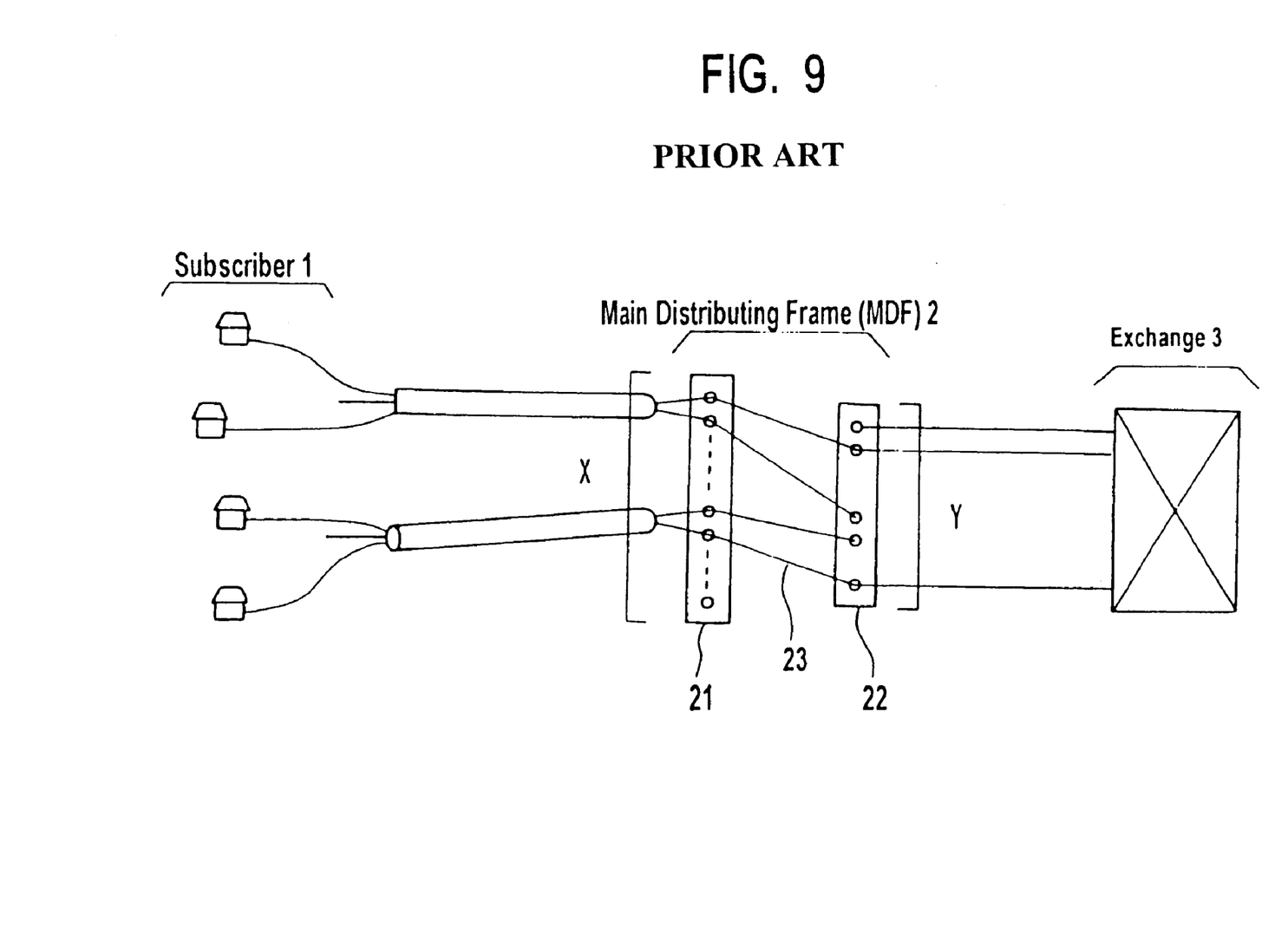
FIG. 9 is an explanatory diagram of a normal function of a main distributing frame (MDF).

FIG. 9 is an explanatory diagram of a function of a main distributing frame (MDF).

The main distributing frame 2 optionally connects plural subscriber terminals 1 to subscriber circuits of an exchange 3. When a subscriber terminal 1 is newly added, the main distributing frame 2 connects the newly added subscriber terminal 1 to the exchange 3. In addition, when the subscriber moves or the subscriber number is changed, the main distributing frame 2 changes the connection.

In the conventional main distributing frame 2, as shown in FIG. 9, terminal boards 21 and 22 are respectively provided for the subscriber terminal 1 and the exchange 3. The subscriber terminals 1 and the subscriber circuit of the exchange 3 are respectively connected to the terminal boards 21 and 22 by a pair of cables. The subscriber terminals 1 are further connected to the exchange 3 by manually connecting jumper wires 23 between the terminal boards 21 and 22.

Further, it is general that the number of terminals on the terminal board 21 for the subscriber terminals 1 are more than that of terminals for the exchange 3 so that the connection with the subscriber circuit of the exchange 3 can be effectively changed.

However, such the change of the connection requires technical engineers. Therefore, for a unattendant telephone exchange provided at a remote location or an isolated island, it is difficult to provide a rapid service, because it required much time to send a technical engineer.

Additionally, connecting operation is performed while the exchange 3 is working. Therefore, it is required to perform the connecting operation without giving any influence on other lines, thus increasing a time of performing the connecting operation as the result.

From the foregoing, an automatic main distributing frame has been introduced in recent years. In the automatic main distributing frame, jumper-wiring is performed by a robot to connect between the terminal boards 21 and 22.

Figure 10A:
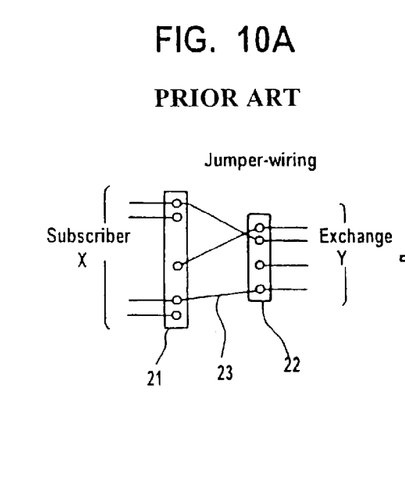
FIGS. 10A, 10B and 10C are explanatory diagrams of an outline of the conventional automatic main distributing frame.
Figure 10B:
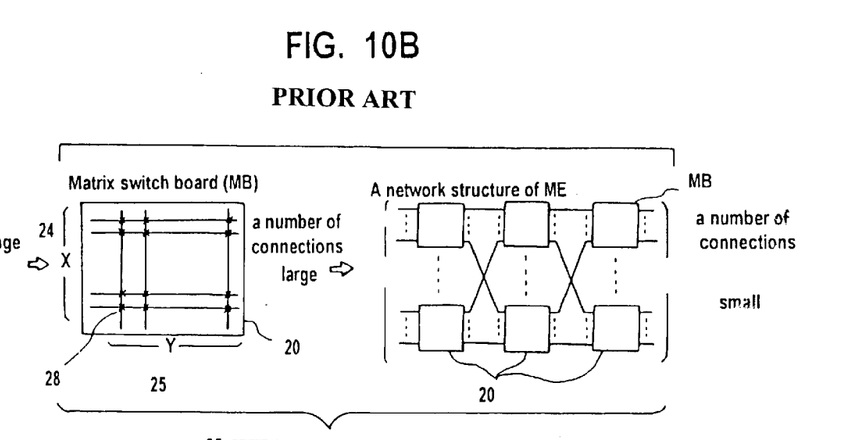
Figure 10C:
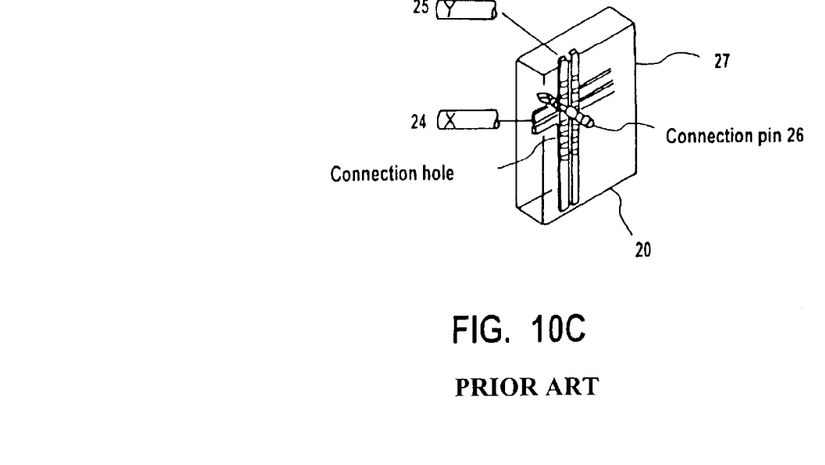

FIGS. 10A, 10B, and 10C are explanatory diagrams of an outline of the conventional automatic main distributing frame.

FIG. 10A shows a structure of the conventional automatic main distributing frame described in FIG. 9, in which the terminal boards 21 and 22 are connected by jumper-wires 23.

FIG. 10B is an explanatory diagram of an automatic main distributing frame, substituted for the conventional automatic main distributing frame using the jumper-wiring connection as explained in FIG. 9. In FIG. 10B, a matrix switch board 20 is employed as a key structural element of the main distributing frame 2.

The matrix switch board 20 has a base board 27, on which plural X and Y conductors 24 and 25 are formed. The matrix switch board 20 further includes plural intersection points 28, at which each X and Y conductors 24 and 25 are crossed each other.

Therefore, it is possible to form an optional connection between the X and Y conductors 24 and 25 by inserting a conductive pin 26 into the intersection point 28. Additionally, a network is constituted to connect multi-stacked plural matrix switch boards 20. As the result, it is possible to connect a large number of terminals on the subscriber side X with a small number of terminals on the exchange side Y.

Figure 11:
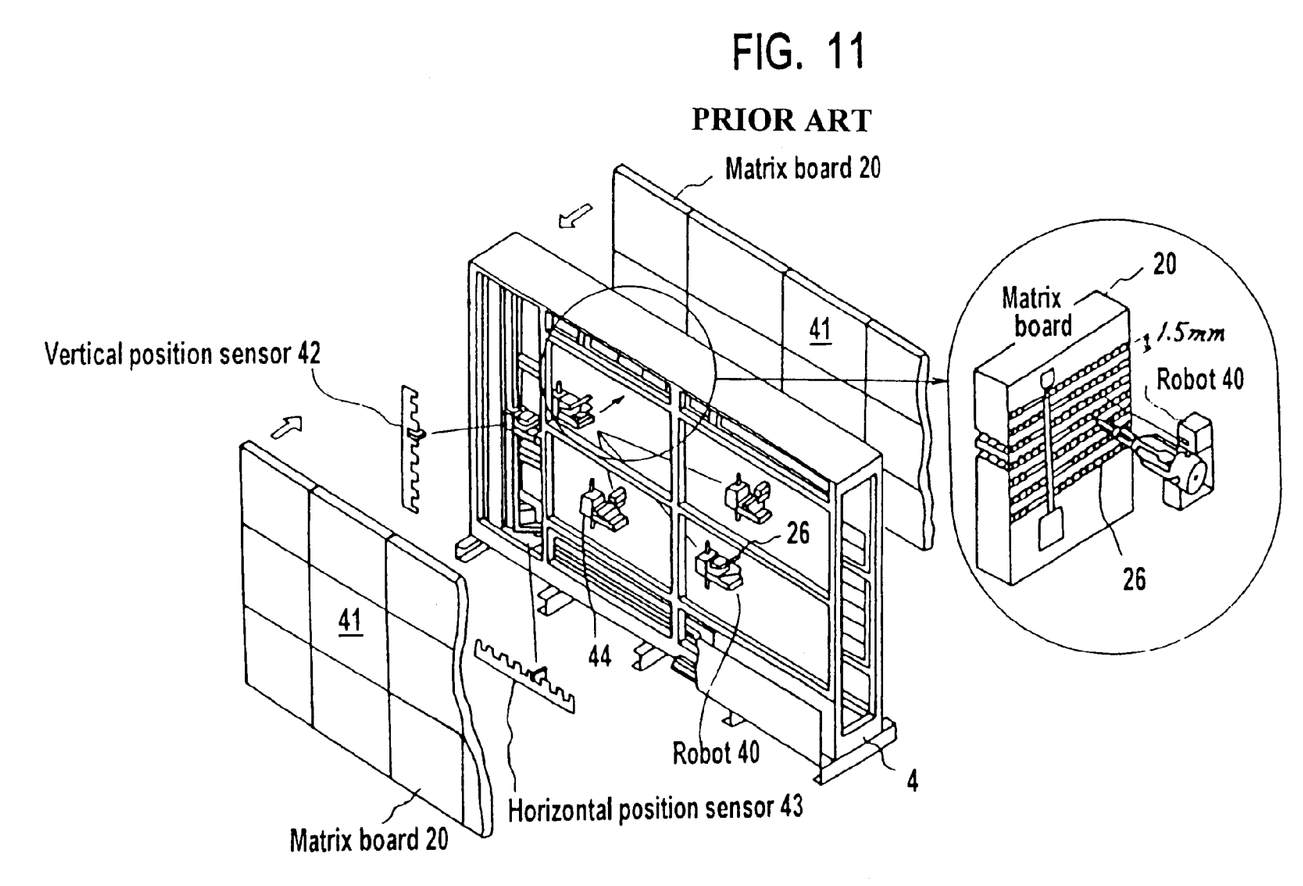
FIG. 11 is a perspective view illustrated by dismantling one of the conventional structure of the automatic main distributing frame.

FIG. 11 is a perspective view of a structure of the conventional automatic main distributing frame, a part of which is dismantled. The structure of FIG. 11 has plural matrix switch boards 20. Each of the plural matrix switch boards 20 has a base board 27 including plural layers of X and Y conductors 24 and 25, which are orthogonal each other, as shown in FIG. 10c.

Additionally, at each of the plural intersection points 28 formed by the conductors 24 on the subscriber side and the conductors 25 on the exchange side, which are orthogonal each other, in each layer, a through hole is provided. Therefore, a conductor 24 on the subscriber side can be connected to a conductor 25 on the exchange side by inserting the conductive pin 26 for connection at an intersection point.

In this example, a robot 40 inserts or extracts the conductive pin 26 for connection, automatically. In the conventional automatic main distributing frame, plural matrix boards 20 are arranged in two dimension so as to form one flat board 41, as show in FIG. 11. Further, a main body 4, in which the robot 40 inserting or extracting the conductive pin 26 is accommodated, is set between two flat boards 41.

The robot 40 detects a specified intersection point 28 from one plain plate 41, and inserts the conductive pin 26 into the through hole of the specified intersection point 28, or extracts the conductive pin 26 from the through hole.

It is possible to rotate a driving hand 44 holding the conductive pin 26, which is attached to the robot 40, and therefore, it is possible to insert the conductive pin 26 into the flat board 41, which is constituted with the plural matrix switch boards, which are provided on the reverse surface of the body 4.

The robot 40 is driven by a driving motor accommodated in the body 4, not shown in FIG. 11, and the position of the robot is controlled by a vertical direction sensor 42 and a horizontal direction sensor 43.

In this example, the connection between the line on the subscriber side and the line on the exchange is performed, while the exchange 3 is working, and one conductive pin 26 is inserted for one line to be connected.

In the above-described conventional automatic main distributing frame, one flat board 41 is formed by arranging the plural matrix switch boards 20 in two dimension. Therefore, the length of the flat board 41 becomes several meters.

Additionally, a connecting tool, i.e., a link bundle line, having connectors on the both sides, is employed to connect between the plural matrix switch boards 20 accommodated in the flat board 41. In this way, as the plural matrix switch boards 20 are arranged on one plain in the conventional automatic main distributing frame, the size should become large.

SUMMARY OF THE INVENTION

Accordingly, it is an object of the present invention to provide a small sized main distributing frame.

Further, when inserting the conductive pin 26 into a through hole, the minimization of the matrix switch board 20 requires severe accuracy of the size. Therefore, it is another object of the present invention to provide an automatic main distributing frame, which can easily maintain the size accuracy required to insert the conductive pin into a through hole.

The above-described objects according to the present invention can be attained by a main distributing frame including, a frame body, plural matrix switch boards accommodated in the frame body, each having matrix switch sections and input/output connectors on a rear section, a back wire board provided on a rear section of the frame body, having connectors connected to the input/output connectors on each rear section of the plural matrix switch boards, and plural robots, each positioned between a pair of two matrix switch board sections of the plural matrix switch boards, each having a hand section for inserting connection pins to the matrix switch sections of the two matrix switch boards.

In one preferred mode of the present invention, each of the plural robots has a frame structure with a vertical axis, which is arranged between upper and lower frames, and moves between the front and rear frames of the frame structure, and the hand section is movably mounted along the vertical axis.

Additionally, in another preferred mode, the back wire board includes reference pins, and reference holes corresponding to the reference pins are provided on the rear frame of the robot, and the robot is fixed by bricking the reference pins and the reference holes when inserting the robot between the pair of two matrix switch boards.

Alternatively, in another preferred mode, the robot includes a front surface having an inward reference pin, the two matrix switch board sections, forming one pair, between which the robot is inserted, have holes corresponding to the reference pins of the front plate of the robot, and the robot is fixed by fitting the holes of the two matrix switch boards with the reference pins when inserting the robot between the two matrix switch board sections.

Further, the back wire board has a reference pin, and the rear frame of the robot has a reference hole corresponding to the reference pin so that the reference pin is fit with the reference hole when inserting the robot between two matrix switch boards, and the robot has a front plate having inward reference pins on the robot frame, the two matrix switch boards, to which the robot is inserted, have holes corresponding to the reference pins of the front plate of the robot so that the reference holes of the robot are fitted with the pins of the two matrix switch boards, when inserting the robot between the corresponding matrix switch boards.

Alternatively, in one mode, the back wire board connects between plural matrix switch boards accommodated in the frame body, having matrix switch sections and input/output connectors on the rear section.

Furthermore, the frame body has plural partitions and a pair of two of the matrix switch boards are inserted and positioned between the partitions.

Additionally, each of the plural matrix switch boards has spacers on upper and lower sections of a surface faced to the inserted robot and on a center section of a surface faced to the partitions.

Alternatively, the main distributing frame further comprises holes to which an insertion and extraction metal fitting is tighten on the front surface of the partitions, and the plural matrix switch boards are inserted by tightening on he holes and rotating the insertion and extraction metal fitting as a supporting point.

Further, the main distributing frame comprises holes, to which one of the insertion and extraction tool is engaged in front of the plural matrix switch boards, and the matrix switch board is extracted by engaging one part of the insertion and extraction tool to the holes of the matrix switch board and rotating the insertion and extraction tool as using the insertion and extraction metal fitting as a supporting point.

Further, other objects of the present invention will become clear by the description for explaining embodiments according to the attached drawings.

BRIEF DESCRIPTION OF THE DRAWINGS

FIG. 5 is a detailed structural example of a head section 102a.

DESCRIPTION OF THE PREFERRED EMBODIMENTS

Throughout the following descriptions, the same reference numerals are used to denote and identify corresponding or identical components.

Figure 1:
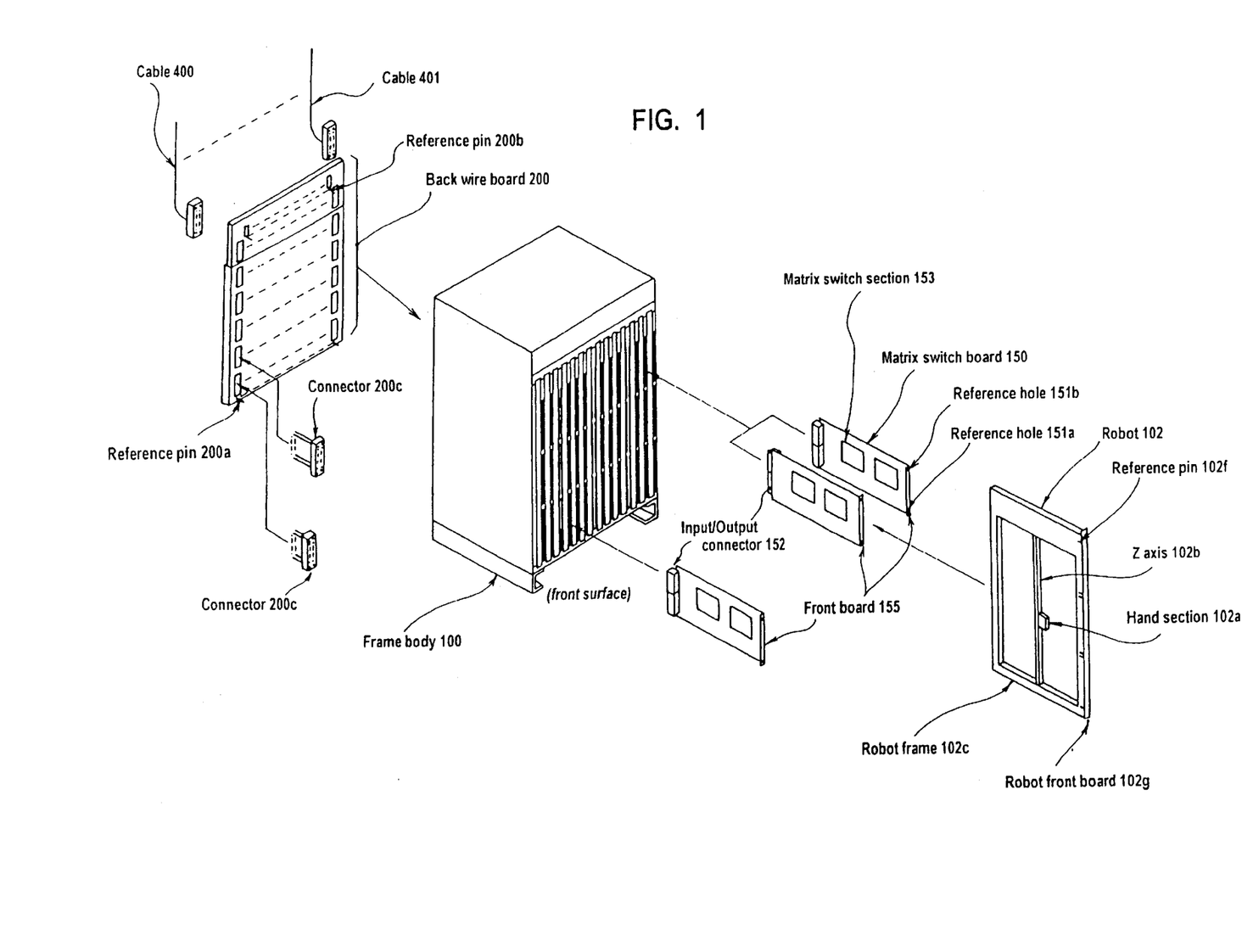
FIG. 1 is a structural diagram of one embodiment of an automatic main distributing frame of the present invention. Especially, the structure of FIG. 1 is shown by dismantling each section.

FIG. 1 is a structural diagram of one embodiment of the automatic main distributing frame according to the present invention. In FIG. 1, the structure is shown by dismantling to each section.

In the structure of FIG. 1, a back wire board 200 is set on a rear side of the frame body 100, and plural matrix switch boards 150 are inserted from a front side of the frame body 100.

Further, as is explained in detail later, a robot 102 is inserted between a pair of the matrix switch boards 150. Plural connectors 200c are provided on the back wire board 200.

Therefore, when the matrix switch boards 150 are inserted into the frame body 100, input/output connectors 152, each of which is provided on the rear edge of the matrix switch board 150, are inserted into corresponding connector 200c to electrically connect between the back wire board 200 and each of the matrix switch boards 150.

Wires are provided on the back wire board 200 to connect between the connectors 200c. Therefore, the plural matrix switch boards 150, each of which is inserted to the frame body 100, are connected each other by the wires provided on the back wire board 200.

Additionally, cables 400 and 401 respectively for subscriber and exchange lines are connected to each connector 200c of the back wire board 200.

Reference pins 200a and 200b are provided on upper and lower sections of the back wire board 200 to position when inserting the robot 102, as explained later.

Each of the matrix switch board 150 has two matrix switch sections 153. As is explained later in FIG. 3A, rows of the X and Y conductors are wired on both sides of the base board 151, and plural through holes are provided along the rows of the X and Y conductors in the matrix switch section 153. It becomes possible to connect any X and Y conductors by inserting one conductive pin 26 into one through hole.

The robot 102 has a robot frame 102c and a Z axis 102b. A hand section 102a is set on the Z axis 102b so as to move up and down along the Z axis 102b. Further, the Z axis 102b is controlled to move forward and backward on the robot frame 102c.

Figure 2:
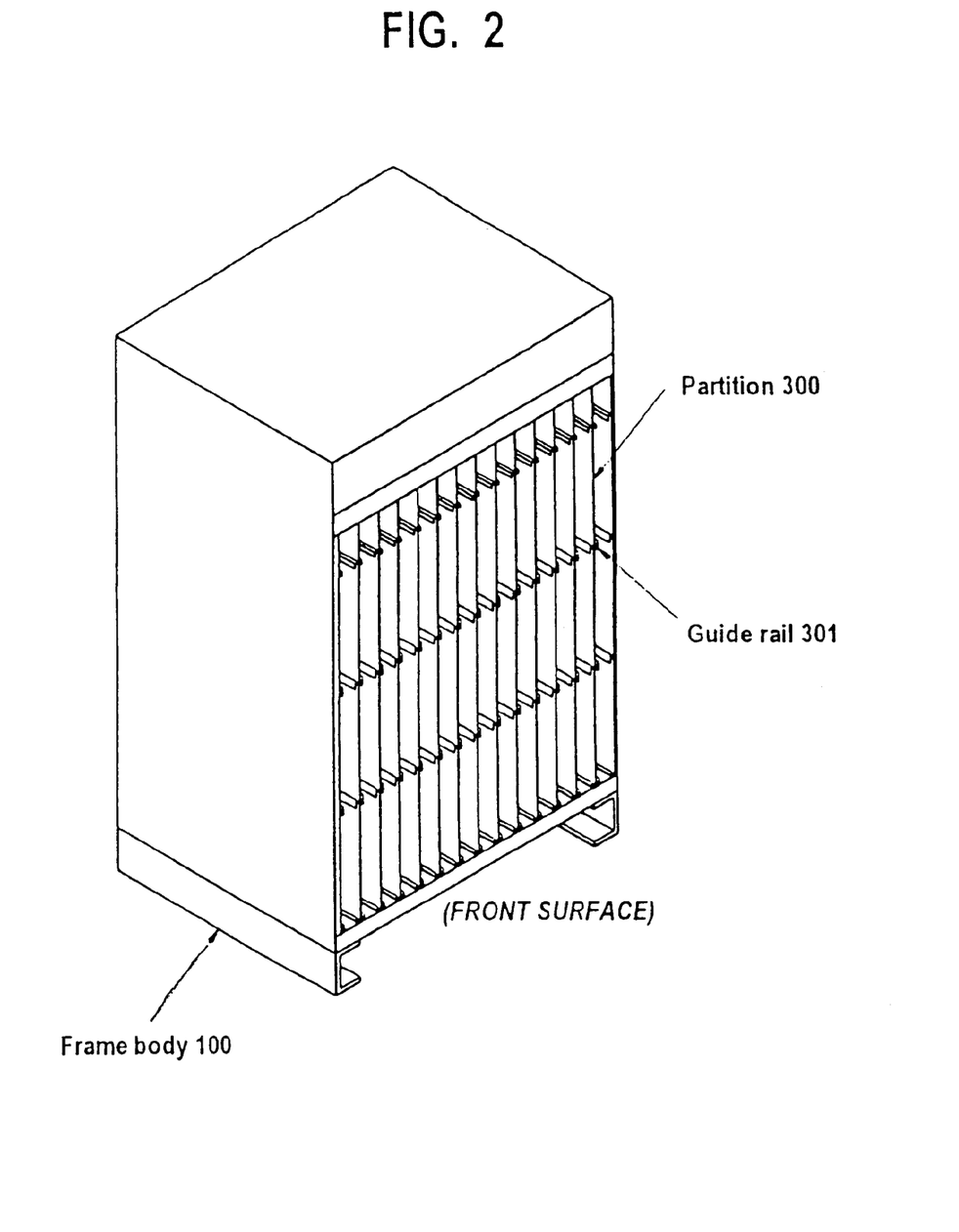
FIG. 2 is a detailed diagram of a frame body 100 shown in FIG. 1.

The hand section 102a and the Z axis 102b are moved by a motor, not shown in FIG. 1, which is set on the upper section of the robot frame 102c through a driving belt, not shown in FIG. 1, FIG. 2 is a detailed structural example of the frame body 100 shown in FIG. 1. The frame body 100 has plural partitions 300. Four Guide rails 301 are vertically arranged on both sides of each of the partition 300.

Therefore, three matrix switch boards 150, shown in FIG. 1, are vertically inserted between two partitions 300 along guide rails 301.

Figures 3A, 3B:
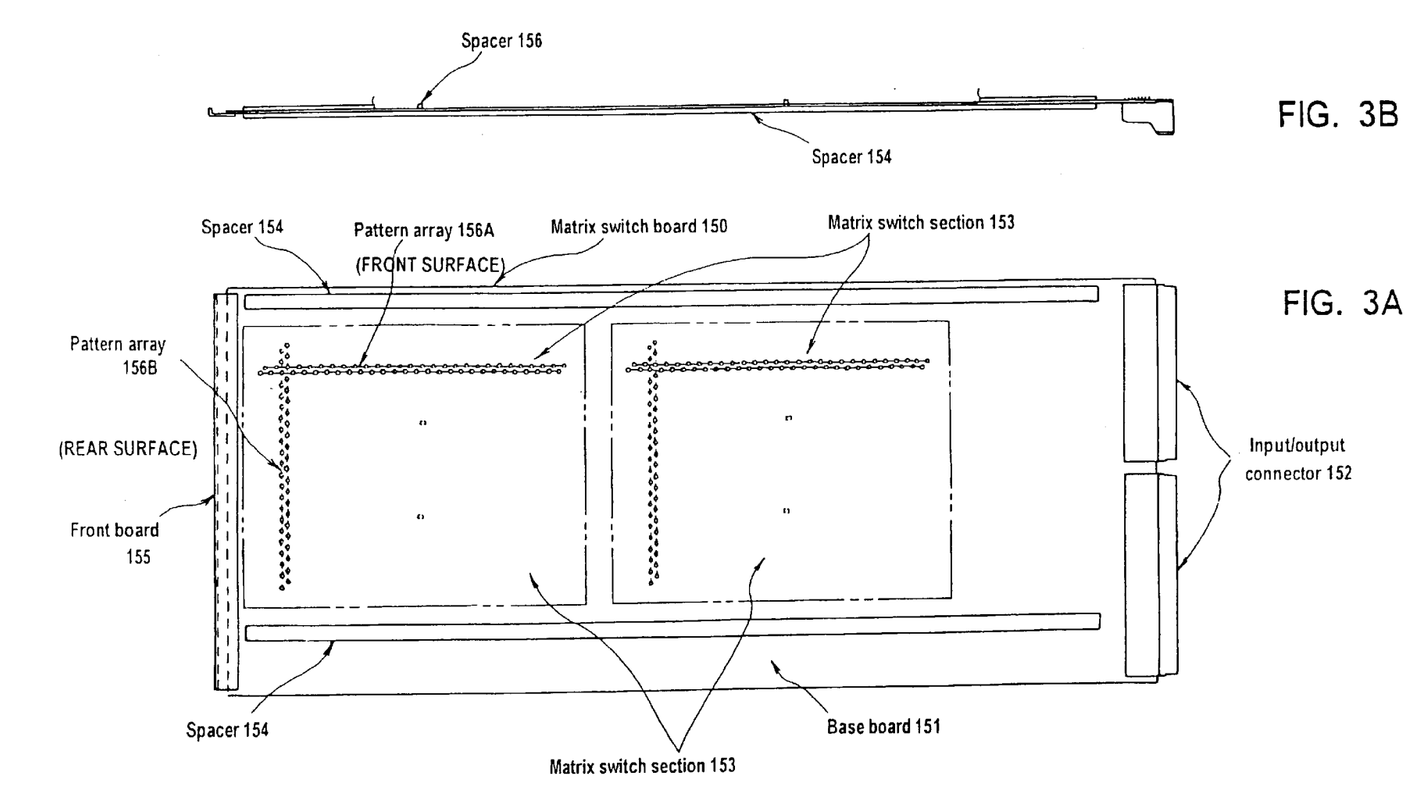
FIGS. 3A and 3B show one embodiment of a matrix switch board 150.

FIGS. 3A and 3B show one embodiment of the matrix switch board 150. FIG. 3A is a side view of the matrix switch board 150, and FIG. 3B is a top view of the matrix switch board 150. Input/output connectors 152 are mounted on the rear side of the matrix switch board 150, and a front plate 155 is mounted on the front side of the matrix switch board 150.

Each of two matrix switch sections 153 of the matrix switch board 150 is constituted by a pattern array 156A, which is formed on the front surface of the base plate 151 with plural X conductors, and pattern array 156B, which is formed on the rear surface of the base plate 151 with plural Y conductors.

Plural through holes are provided on the plural X and Y conductors of the pattern arrays 156A and 156B, and therefore, the through holes are arranged in a matrix.

Therefore, intersection points corresponding to the X and Y conductors are electrically connected by inserting the conductive pins, which are explained later, into the through hole.

A plate-shaped spacers 154 are provided on upper and lower sections of the front surface of the base plate 151 of the matrix switch board 150. Further, plural spacers 156 are arranged on a center section of the rear surface of the base plate 151 of the pattern array 156B of the matrix switch board 150.

These spacers 154 and 156 keep a parallelism of the matrix switch board 150, when the matrix switch board 150 is inserted between the partitions 300, as explained later.

Figures 4A, 4B:
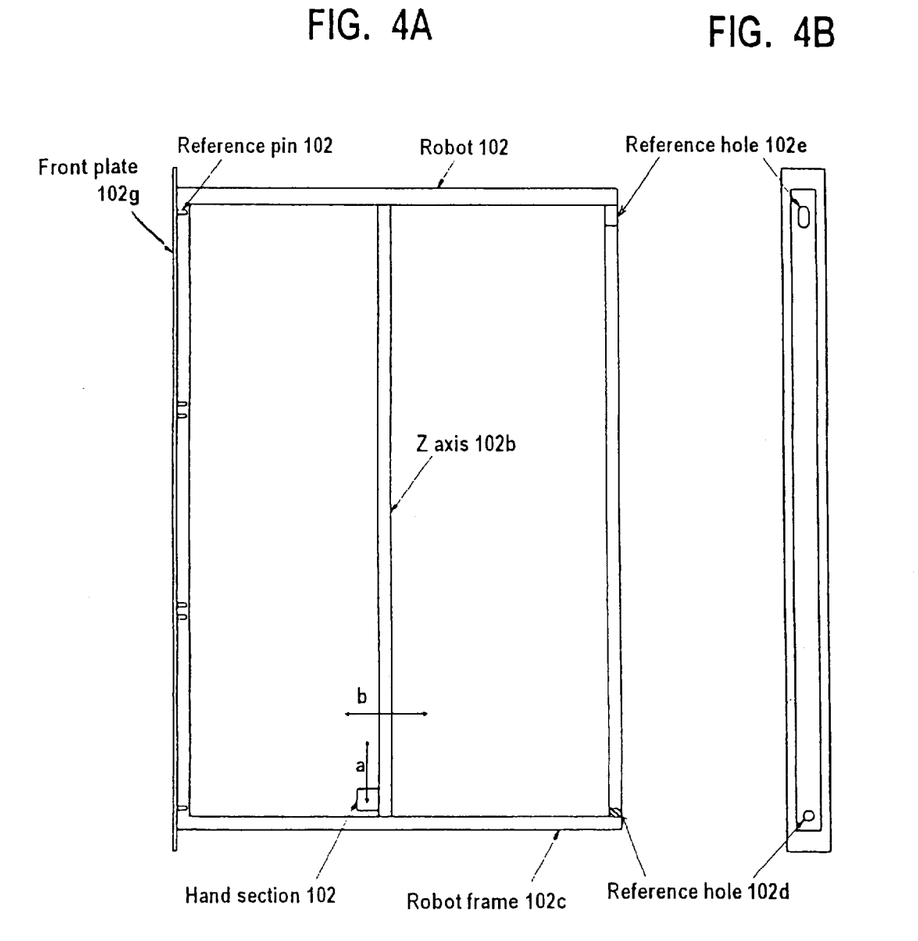
FIGS. 4A and 4B are detailed structural diagrams of a robot 102.

FIGS. 4A and 4B are a detailed structural diagram of the robot 102. FIG. 4A is a side view and FIG. 4B is a view from the rear surface of the robot 102.

The robot 102 is formed by a robot frame 102c. A front plate 102g is provided on the front surface of the robot 102. Three sets of reference pins 102f corresponding to the upper and lower sections of each of the matrix switch boards 105, which are inserted into three sections are provided on the rear surface of the front plate 102g.

Reference holes 102e and 102d are provided on the upper and lower sections on the rear side of the front plate 102g.

The reference holes 102e and 102d position the robot 102 in correspondence to the reference pins 200b and 200a of the back wire board 200, when inserting the matrix switch board 105 between the partitions 300 in FIG. 1.

Additionally, the Z axis 102b is provided on the robot 102 to be parallel to the front plate 102g, as explained above, and a hand section 102a is provided on the Z axis 102b.

The Z axis 102b is driven so as to move forward and backward to the front plate 102g in a direction "b", shown by an arrow in FIG. 4A, and the hand 102a is driven to move upward and downward along the Z axis 102b in a direction "a".

Figure 5:
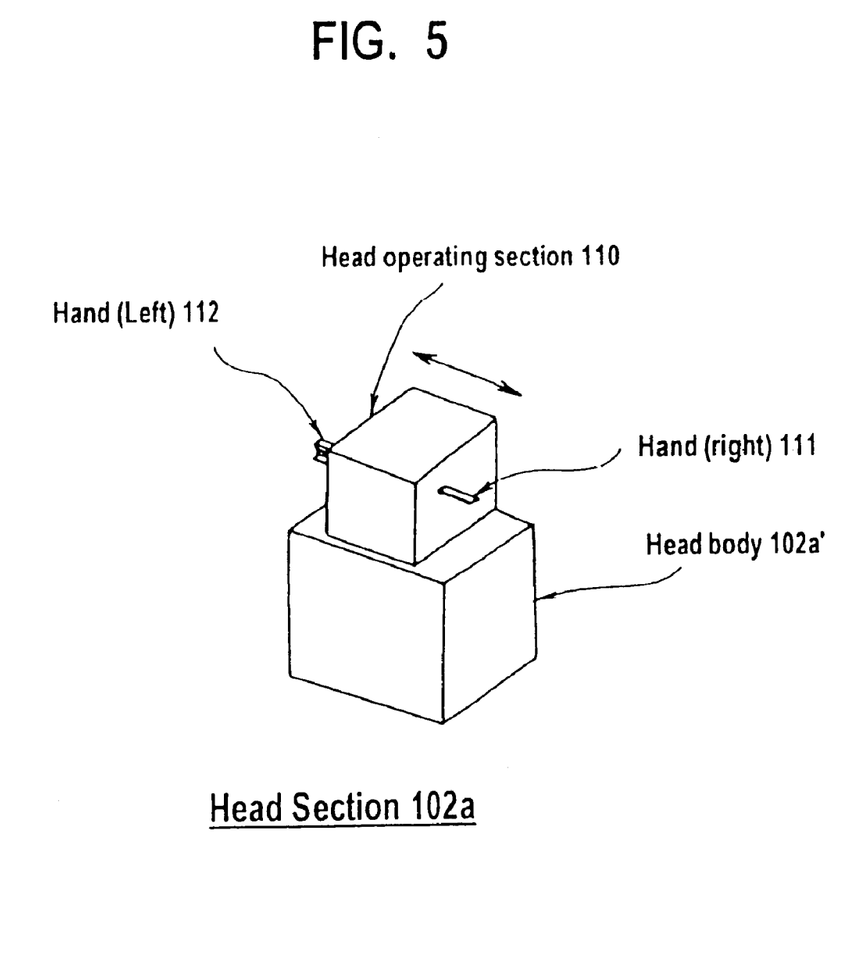

FIG. 5 is a detailed structural example of the head section 102a. The head body 102a is mounted on the Z axis 102b so as to move upward and downward, as explained above. A head operating section 110 is provided on the head body 102a.

Hands 111 and 112 are provided on the head operating section 110. The hands 111 and 112 are controlled to move side by side by an inner mechanism of the head operating section in the direction of the arrow to lead the conductive pin 26 to the direction of faced matrix switch boards 150.

Then, the hands 111 and 112 respectively hold conductive pins, and the conductive pins are inserted into the through holes of the corresponding pattern array when the head section 102a is positioned on optional positions of the matrix switch section 153 of the matrix switch board 150. Thereby, the pattern array 156a can be connected by the pattern array 156b.

Figure 6:
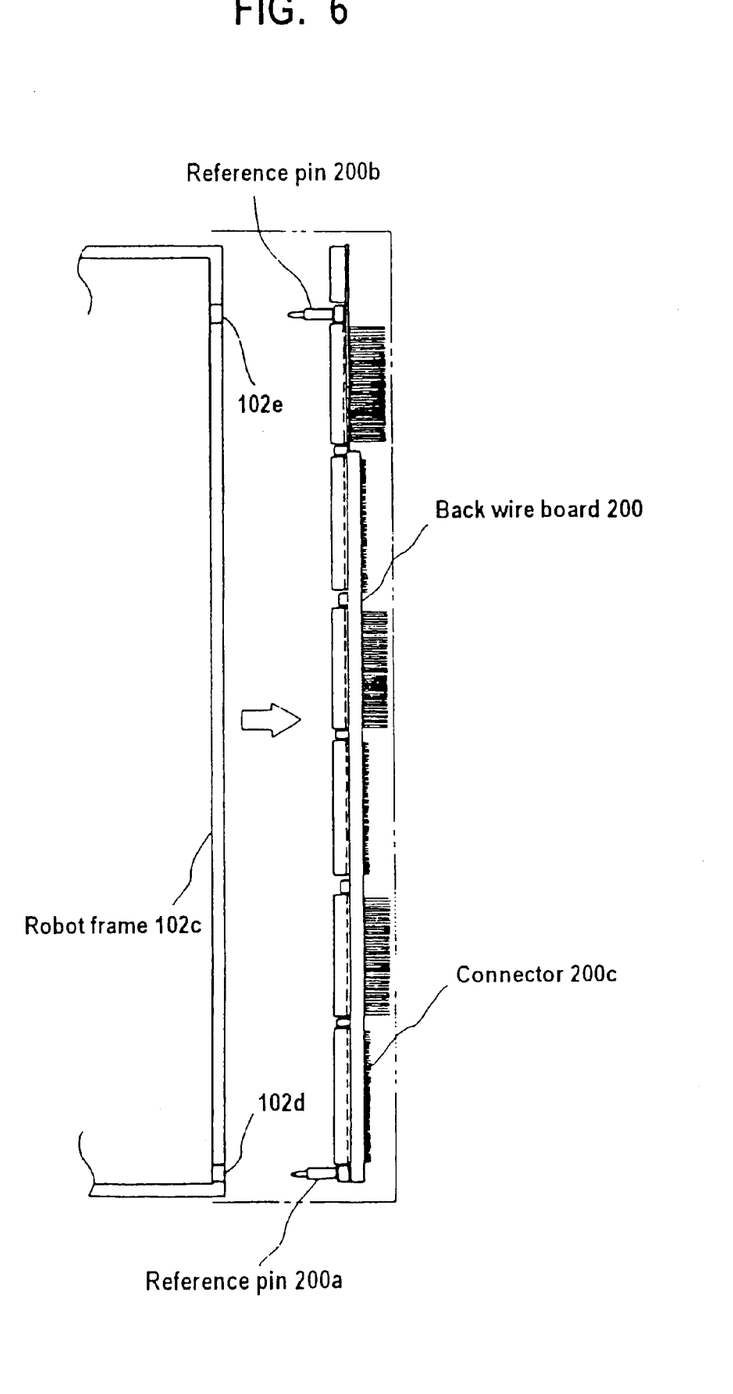
FIG. 6 is a side view of a back wire board 200.

FIG. 6 is a view from the side of the back wire board 200.

The connectors 200c are provided on the back wire board 200, and the reference pins 200a and 200B are inserted in correspondence to the reference holes 102d and 102e, which are provided on the robot frame 102c of the robot 102. Thereby, it becomes possible to accurately position the robot 102.

Figure 7:
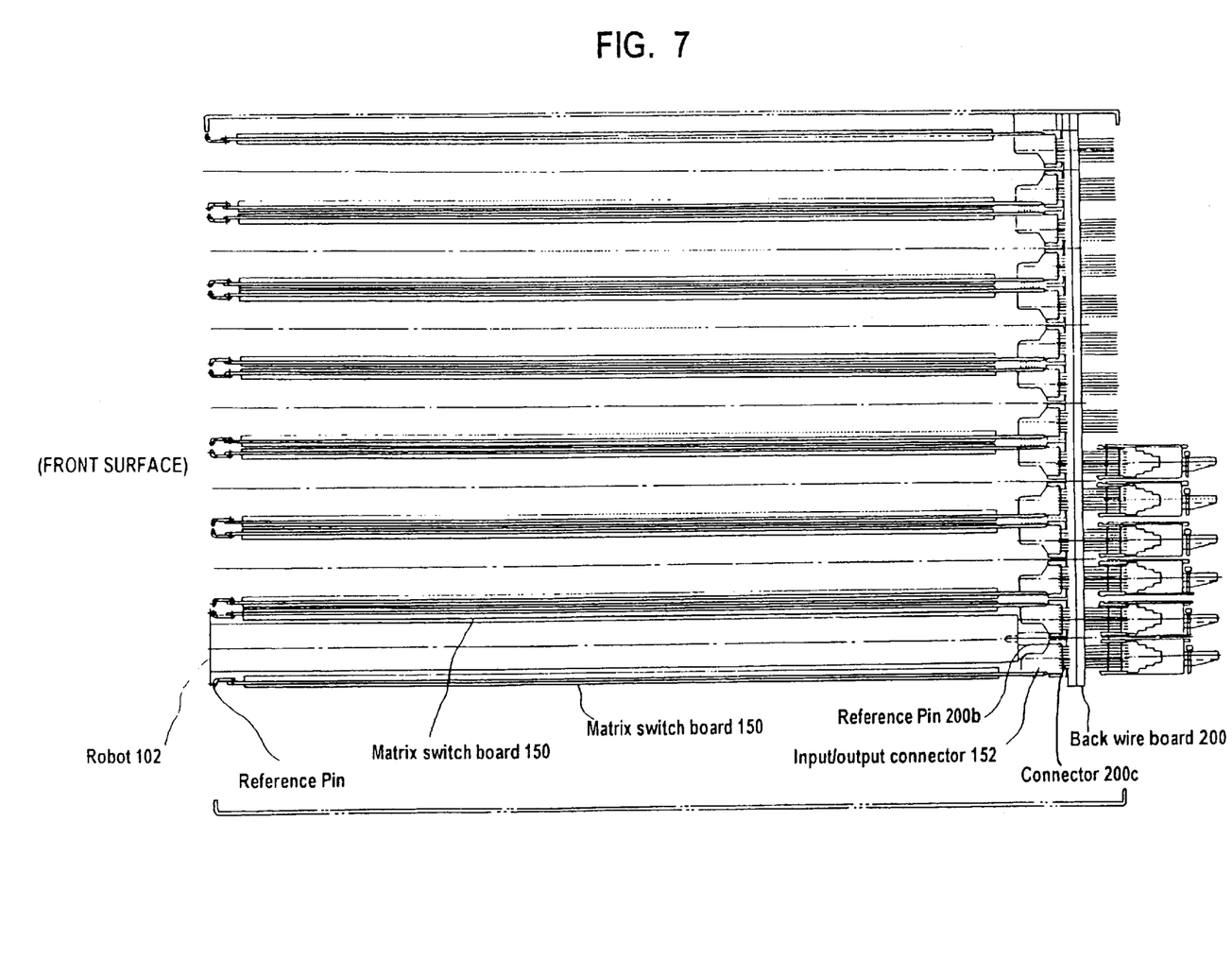
FIG. 7 is a cross sectional view from a top surface of the frame body 100.

FIG. 7 is one part of a cross sectional view from the top surface of the frame body 100. Especially, it shows that the robot 102 is inserted into the frame body 100. The matrix switch boards 150 are positioned on both sides of the inserted robot 102. It is apparent from FIG. 7 that the reference pins 200a and 200b of the back wire board 200 are inserted to the reference holes 102d and 102e on the rear side of the robot 102.

It is further apparent from FIG. 7, that the input/output connectors 152 provided on the rear end of the matrix switch board 150 is connected to the connectors 200c of the back wire board 200.

Figure 8A:
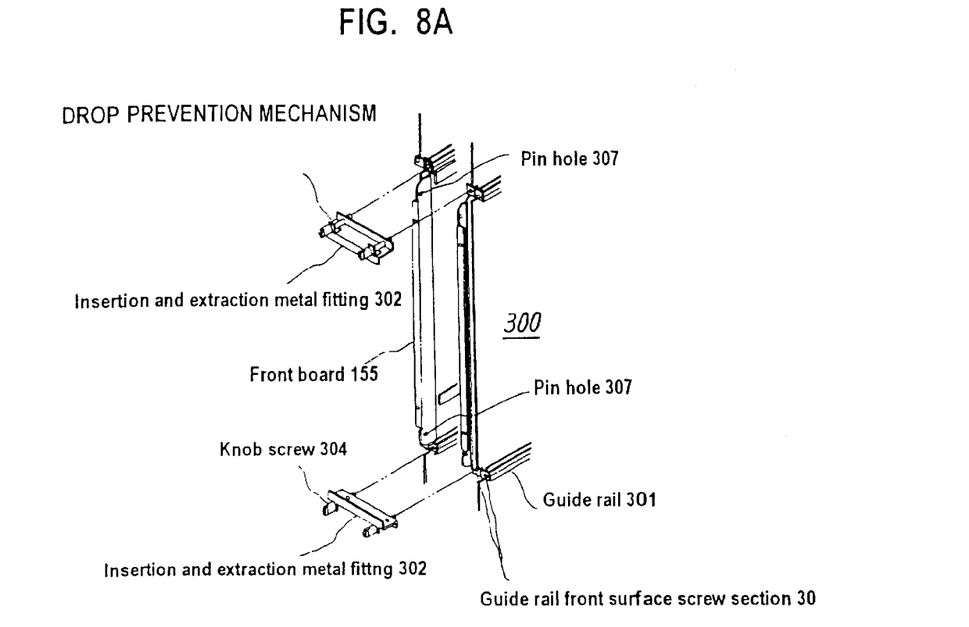
FIGS. 8A, 8B and 8C are explanatory diagrams of an inserting or extracting operation of the matrix switch board 150 to the frame body 100.
Figure 8B:
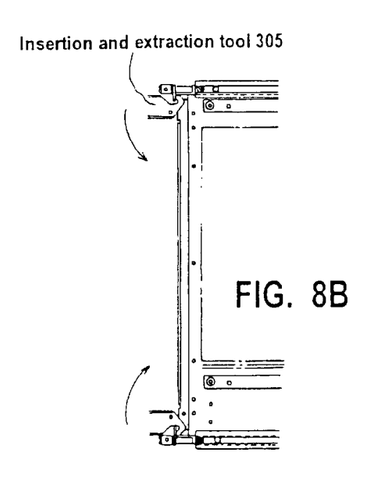
Figure 8C:
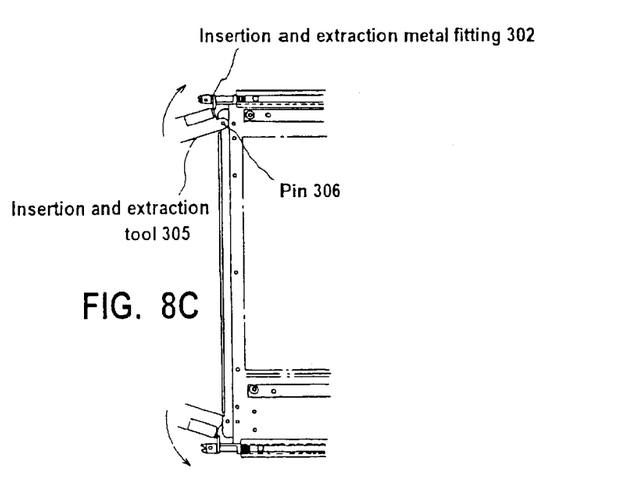

FIGS. 8A, 8B and 8C are explanatory diagram of operations for inserting and extracting the matrix switch board in and from the frame body 100. As shown in FIG. 8A, a guide rail front surface screw section 303 where an insertion and extraction tool 302 is snapped by a screw is included on the front surface of the guide rail 301 provided on the partition 300 of the frame body 100.

When inserting the matrix switch board 150, the insertion and extraction metal fitting 302 is mounted to the guide rail front surface screw section 303 by a knob screw 304.

As shown in FIG. 8b, a push force is given to the front plate 155 of the matrix switch board 150 by putting one end of the insertion and extraction tool 305 to the insertion and extraction tool 302, and rotating one end as a supporting point. Thereby, the matrix switch board 150 is easily pushed to the frame body 100, and the connector 200c of the back wire board 200 is connected to the input/output connector 152 of the matrix switch board 150.

Further, FIG. 8C is an explanatory diagram of an operation for extracting the matrix switch board 150. After the insertion and extraction metal fitting 302 is tighten to a screw hole made on the surface of the partition 300 by knob screw 304, similarly to the above-described case, a pin 306 provided on the other end of the insertion and extraction tool 305 is pricked to a pin hole 307 provided on the front surface of the matrix switch board 150 (refer to FIG. 8A).

Then, it becomes possible to detach and extract the input/output connector 152 of the matrix switch board 150 from the back wire board 200 by rotating as putting the insertion and extraction tool 305 on the insertion and extraction metal fitting 302.

As is explained in accompanying with the attached drawings, in the present invention, a distance that the hand section 102a of the robot 102 moves can be small by inserting the plural sections of the robot 102 between the partitions 300, thus speeding up to control inserting conductive pins.

Additionally, when inserting the matrix switch board 150 into the frame body 100 by pricking the reference pins to the reference holes, the robot 102 inserted between the matrix switch boards 150 can be accurately positioned.

Therefore, according to the present invention, it becomes possible to make the size of an automatic main distributing frame small, and it is also possible to realize high accuracy when inserting the conductive pins.

The present invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A main distributing frame, comprising:
   a frame body;
   plural matrix switch boards accommodated in the frame body, each having matrix switch sections and input/output connectors on a rear section;
   a back wire board provided on a rear section of the frame body, having connectors connected to the input/output connectors on each rear section of the plural matrix switch boards; and
   a plurality of robots, each positioned between a pair of two matrix switch board sections of the plural matrix switch boards, each having a hand section for inserting connection pins to the matrix switch sections of the two matrix switch boards,
   wherein each of the robots has a frame structure with a vertical axis, which is arranged between upper and lower frames of the frame structure, and moves between front and rear frames of the frame structure, the hand section is movably mounted along the vertical axis,
   the back wire board includes reference pins,
   the rear frame of the robot includes reference holes corresponding to the reference pins of the back wire board, and,
   the robot is fixed by fitting the reference pins of the back wire board into the reference holes when inserting the robot between the pair of two matrix switch boards.

2. The main distributing frame according to claim 1, wherein the robot includes a front surface having an inward reference pin, the two matrix switch board sections, forming one pair, between which the robot is inserted, have holes corresponding to the reference pins of the front plate of the robot, and
   the robot is fixed by fitting the holes of the two matrix switch boards with the reference pins when inserting the robot between the two matrix switch board sections.

3. The main distributing frame according to claim 1, wherein the back wire board has a reference pin, and the rear frame of the robot has a reference hole corresponding to the reference pin so that the reference pin is fitted with the reference hole when inserting the robot between two matrix switch boards, and
   wherein the robot has a front plate having inward reference pins on the robot frame,
   the two matrix switch boards, to which the robot is inserted, have holes corresponding to the reference pins of the front plate of the robot so that the reference holes of the robot are fitted with the pins of the two matrix switch boards, when inserting the robot between the corresponding matrix switch boards.

4. The main distributing frame according to claim 1, wherein the back wire board connects between plural matrix switch boards accommodated in the frame body, having matrix switch sections and input/output connectors on the rear section.

5. The main distributing frame according to claim 1, wherein the frame body has plural partitions and a pair of the matrix switch boards are inserted and positioned between the partitions.

6. The main distributing frame according to claim 5, wherein each of the plural matrix switch boards has spacers on upper and lower sections of a surface faced to the inserted robot and on a center section of a surface faced to the partitions.

7. The main distributing frame according to claim 6, further comprising:
   holes to which an insertion and extraction metal fitting is tighten on the front surface of the partitions,
   wherein the plural matrix switch boards are inserted by tightening on the holes and rotating the insertion and extraction metal fitting as a supporting point.

8. The main distributing frame according to claim 7, further comprising holes, to which one of the insertion and extraction tool is engaged, in front of the plural matrix switch board,
   wherein the matrix switch board is extracted by engaging one part of the insertion and extraction tool to the holes of the matrix switch board and rotating the insertion and extraction tool as using the insertion and extraction metal fitting as supporting point.

* * * * *